3,562,025
DESCALING COPPER RODS
Clermont J. Snyder and Jack P. Moore, Hastings-on-Hudson, N.Y., assignors to Anaconda Wire and Cable Company
Filed Apr. 1, 1969, Ser. No. 812,283
Int. Cl. C21d 1/42
U.S. Cl. 148—13.2    8 Claims

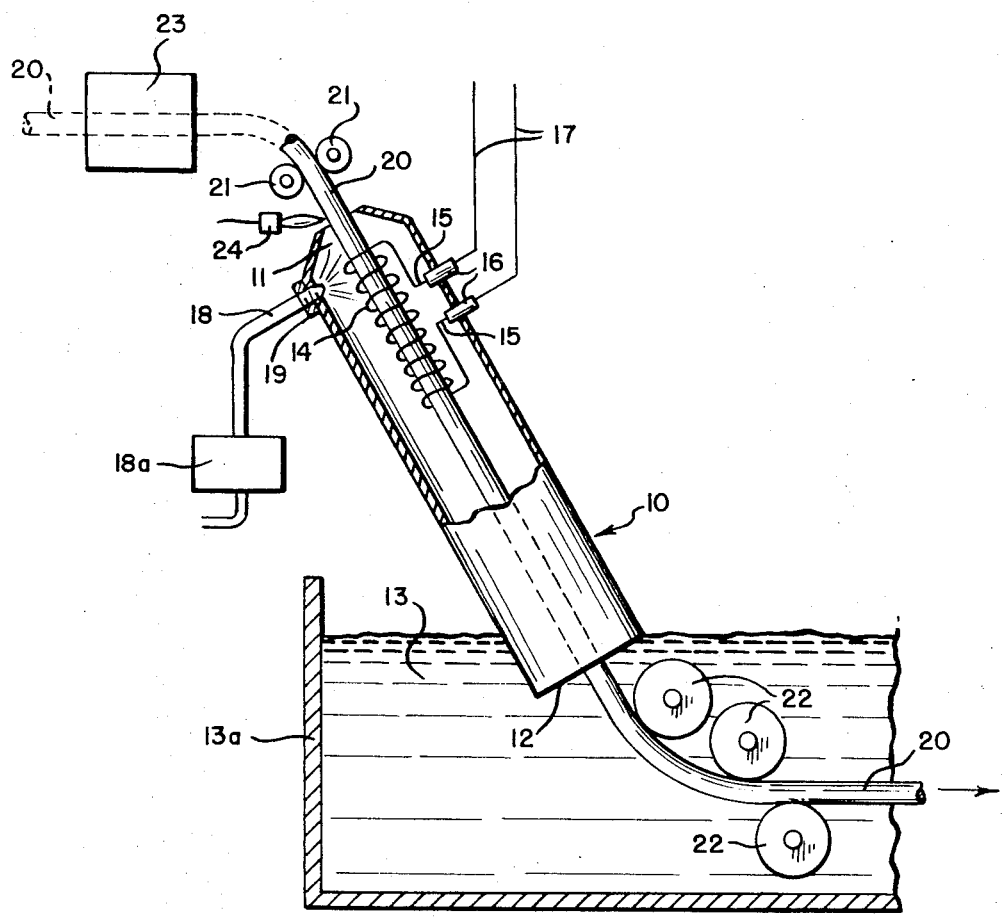

ABSTRACT OF THE DISCLOSURE

Oxide scale is removed from a copper rod by continously introducing the rod at a temperature not exceeding 1000° F. into a tubular chamber in which the rod is inductively heated to a temperature above 1100° F. (up to 1400° F.) and exposed to a reducing atmosphere to reduce the oxide scale to metallic copper. Immediately thereafter, the rod is quenched in a liquid coolant to a temperature below that at which any substantial reoxidation can occur.

---

This invention relates to a method and an apparatus for removing oxide scale from copper rods.

Copper rods from which copper wire is drawn are formed by hot-rolling cast copper wire bars. The hot-rolled copper rod is usually circular in cross-section and about 5/16 inch in diameter. Since the hot-rolling operation is normally carried out in the open air, the rod becomes covered with an oxide scale, some of which is only loosely adherent to the underlying metal, and this scale must be removed before the rod is cold-drawn into wire.

A procedure long used for removing scale from copper rod involves immersing the rod in a dilute sulfuric acid solution (a procedure commonly known as pickling). Black cupric oxide scale is readily removed by this procedure, but the underlying and more firmly adherent red cuprous oxide scale may be only partly removed. Another procedure which long has been used to ensure thorough removal of scale involves drawing the rod (usually after pickling) through a scalping die by which a thin shaving is mechanically taken from the surface of the rod. Other procedures for removing scale from copper rod have also been developed. One process which has enjoyed marked success involves exposing the rod to an atmosphere containing a halide or halogen vapor at a temperature below 700° F., then heating to a dull red heat (e.g. about 1200° F.) and then cooling to room temperature. This results in formation of a scale which separates readily and leaves the surface of the rods clean, free of dust and slivers, and without objectionable pits.

These commercially-used descaling procedures all involve the consumption of a substantial part of the copper rods in the form of scale loss or scrap. Generally, this loss amounts to as much as 1% to 5% of the weight of the rods, and special reclaiming procedures are necessary to recover the metal values of the scale scrap or pickle liquor.

The present invention provides a novel method and apparatus for removing oxide scale from copper rods without the problem of copper loss and special reclaiming procedures described above, and is based upon the discovery that all of the oxide scale on a hot-rolled copper rod can be readily reduced to metallic copper, which is tenaciously bonded to the rod and does not adversely affect its quality for wire-drawing, by inductively heating the rod to a temperature from about 1100° F. to about 1400° F. and exposing the heated rod to a reducing atmosphere.

The use of induction heating is an especially important feature of the invention since thereby a very rapid heating of the copper rod is achieved which, due to the skin effect, is localized and concentrated in the oxide scale layer and underlying surface of the rod to give a uniform temperature gradient in the scale layer. Consequently, after the oxide scale has been reduced, the resulting layer of metallic copper correspondingly has an exceptionally uniform quality and the layer is so intimately and tenaciously bonded to the underlying copper as to be virtually indistinguishable from the remainder of the rod. Furthermore, the depth of heating in the rod can be readily varied and controlled by use of an appropriate size, shape and operating frequency for the inductive heating means (such as an inductor coil), and the absence of flames, except for a small optional waste gas pilot flame, during operation of the process minimizes fire hazards. These advantages provide, in the commercial practice of the invention, economic savings and technical improvements not heretofore known.

In performing the method of the invention, a hot-rolled copper rod with oxide scale on its surface is continuously introduced into a descaling zone comprising, for example, an elongated or tubular chamber. The rod may be obtained directly from the hot-rolling operation while still at an elevated temperature or from a pre-wound coil formed as a separate product of the hot-rolling operation. In any case, the rod is introduced into the chamber at any temperature up to but not exceeding 1000° F. This is important, for if the rod temperature exceeds 1000° F. when first introduced, the subsequent layer of metallic copper reduced from the oxide scale will not be adequately bonded to the remainder of the rod. The rod may, however, be pre-heated to any temperature between 500° F. and 1000° F. before introduction into the chamber, either by being derived directly from the hot-rolling operation or by passing a cold supply of it through a furnace, to reduce the amount of additional heating required in the chamber to raise its temperature to the level at which reduction takes place.

Following its introduction into the descaling chamber, the copper rod is passed through the open core of an electrically-energized inductor coil and as a result, it is inductively heated and raised in temperature to between 1100° F. and 1400° F. to a certain depth below its surface by the electric eddy currents which are electro-magnetically induced to flow in that depth. The size, shape and operating frequency of the inductor coil are selected to provide inductive heating to the required temperature in a depth which includes at the minimum the oxide scale as well as clean unoxidized copper underlying the scale, to ensure that all of the scale will be reduced to metallic copper. However, while not essential the depth of heating can be increased beyond the minimum by for example, lowering the frequency of the energizing alternating current supplied to the inductor coil.

The heated copper rod is directly exposed in the chamber to a reducing atmosphere which will reduce the cupric and cuprous oxides in the scale layer to metallic copper. For this purpose, a reducing gas, such preferably as carbon monoxide, is introduced into the chamber. Hydrogen or hydrogen releasing gases which may cause hydrogen embrittlement of the copper should be avoided. The bulk of the above-described reducing gas is formed of carbon monoxide as the active reducing agent, the balance being nitrogen and carbon dioxide, and such mixtures can be used in practicing the invention.

Preferably, a flowing stream of reducing gas is injected into the chamber at a point adjacent to the location of the inductor coil so that the injected gas may envelop and pass counter-current to the rod to effect reduction of its hot oxide scale.

The reducing gas may, when injected into the chamber, be approximately at ambient temperature, since the operative temperature for the reduction reaction can be achieved solely by inductive heating of the copper rod. However, if desired, the reducing gas may be pre-heated before its injection into the chamber to any temperature up to about 1400° F. to minimize temperature differentials inside the chamber.

After the oxide scale has been reduced to metallic copper, the rod is immediately quenched in a liquid coolant to a temperature below that at which any substantial reoxidation of the copper can occur. This is best achieved by positioning the exit end of the descaling chamber below the surface of a liquid coolant such as water, whereby the rod will pass directly from the reducing atmosphere within the chamber into the coolant without intervening exposure to the atmosphere. The coolant is held in a suitable open-top container or trough and may be circulated through a heat exchanger to extract the heat transferred to it from the quenched rod.

Further details of the invention will be readily understood by reference to the accompanying drawing which illustrates one method and apparatus embodiment thereof.

Reference number 10 denotes a tubular chamber, partly shown in section for better illustration of details, having a constricted entrance end 11 and exit end 12. The exit end 12 is submerged below the surface of a volume of cooling water 13 held in a trough 13A, and the chamber 10 is supported by any suitable means (not shown) over the cooling water so that its length is at an angle with respect to the surface of the cooling water.

An inductor coil 14 is positioned within chamber 10 adjacent the entrance end 11, the opposite ends of the coil being integral with conductors 15 which extend through insulative supports 16 and connect to outside leads 17 communicating with a source of alternating current. Adjacent to coil 14 is a conduit 18 extending through the wall of chamber 10 and sealed and mounted thereto by a coupling 19. The conduit 18 conducts a flow of reducing gas which may be preheated in the furnace 18A and supplied to the furnace from any convenient source (not shown).

A copper rod 20 is advanced through chamber 10 by guide rolls 21 at the same inclination with respect to the upper surface of cooling water 13 as that of the chamber and, upon emerging from exit end 12, is bent by guide rollers 22 into a position and path of travel substantially parallel to the upper surface of the water. A preheating furnace 23 is arranged to pre-heat rod 20, if desired, before it is introduced into entrance end 11. Also, a burner 24 directs a pilot flame into the open mouth of entrance end 11.

In the operation of the foregoing apparatus, the copper rod 20 with an oxide scale on its surface continuously enters the entrance end 11 of chamber 10 at a temperature up to 1000° F. and may be pre-heated in furnace 23 for this purpose. The rod passes through inductor coil 14 and thereby is heated to a temperature from 1100° F. to 1400° F. in at least the portion of its depth which includes the layer of oxide scale plus unoxidized copper below such layer. Simultaneously, reducing gas is injected into the chamber via conduit 18 to envelop the heated rod and maintain a reducing atmosphere in the chamber interior and thereby reduce the oxide scale to metallic copper. The inclination of chamber 10 at an angle with respect to the surface of cooling water 13 helps to increase the residence time of the injected reducing gas in the chamber 10, and this gas as well as the oxidized gases formed as a consequence of the reduction reaction (i.e. $CO_2$) passes out of the chamber through entrance end 11. The pilot flame of burner 24 ignites any residual carbon monoxide that may be included in the gases exiting from the entrance end 11 to prevent its escape into the atmosphere.

The descaled copper rod 20 leaves the chamber 10 through its submerged exit end 12 directly into the cooling water 13 and is thereby immediately quenched without being exposed to air or other oxidizing atmosphere after reduction of its oxide scale. The rod 20 is maintained in the cooling water long enough to reduce its temperature below that of reoxidation and then is removed for further processing as descaled, clean, bright copper rod.

The invention has been described in terms of its operative principles and a specific embodiment thereof. Many variations in the illustrated embodiment will be obvious to those skilled in the art without departing from the invention. Accordingly, the scope of the invention is to be determined by reference to the appended claims.

We claim:

1. The method of descaling a copper rod having oxide scale on its surface which comprises continuously introducing said rod at a temperature not exceeding 1000° F. into a descaling zone and passing it therethrough, inductively inducing flow of electric eddy currents in said rod as it passes by a predetermined location in said zone to heat and raise the temperature of said rod above 1100° F., exposing said heated rod directly to a reducing atmosphere to reduce said oxide scale to metallic copper, and thereafter immediately quenching said rod in a liquid coolant to a temperature below that at which any substantial reoxidation of the copper can occur.

2. The method according to claim 1 wherein a flow of reducing gas is injected into said descaling zone at a point adjacent to said predetermined location, said injected reducing gas enveloping said rod and passing countercurrent thereto to effect the reduction of said oxide scale.

3. The method according to claim 2 wherein said reducing gas is at approximately ambient temperature when injected into said descaling zone.

4. The method according to claim 2 wherein said reducing gas is heated to a temperature up to about 1400° F. before its injection into said descaling zone.

5. The method according to claim 1 wherein the point at which said rod exits from said descaling zone is submerged below the surface of said liquid coolant.

6. The method according to claim 1 wherein the temperature of said rod when introduced into said descaling zone is between 500° F. and 1000° F.

7. The method according to claim 1 wherein said rod is inductively heated to a temperature between 1200° F. and 1400° F.

8. The method according to claim 1 wherein said copper rod is hot-rolled to size at red heat and introduced into said descaling zone directly from said rolling operation while still at an elevated temperature.

References Cited
UNITED STATES PATENTS 2,643,961   6/1953   Snyder et al. _____ 148—13.2

RICHARD O. DEAN, Primary Examiner

U.S. Cl. X.R.

148—20.3, 150, 154